Dec. 11, 1934.  I. C. MATTHIESSEN  1,983,702
VARIABLE SPEED POWER TRANSMISSION
Filed April 13, 1932    4 Sheets-Sheet 1
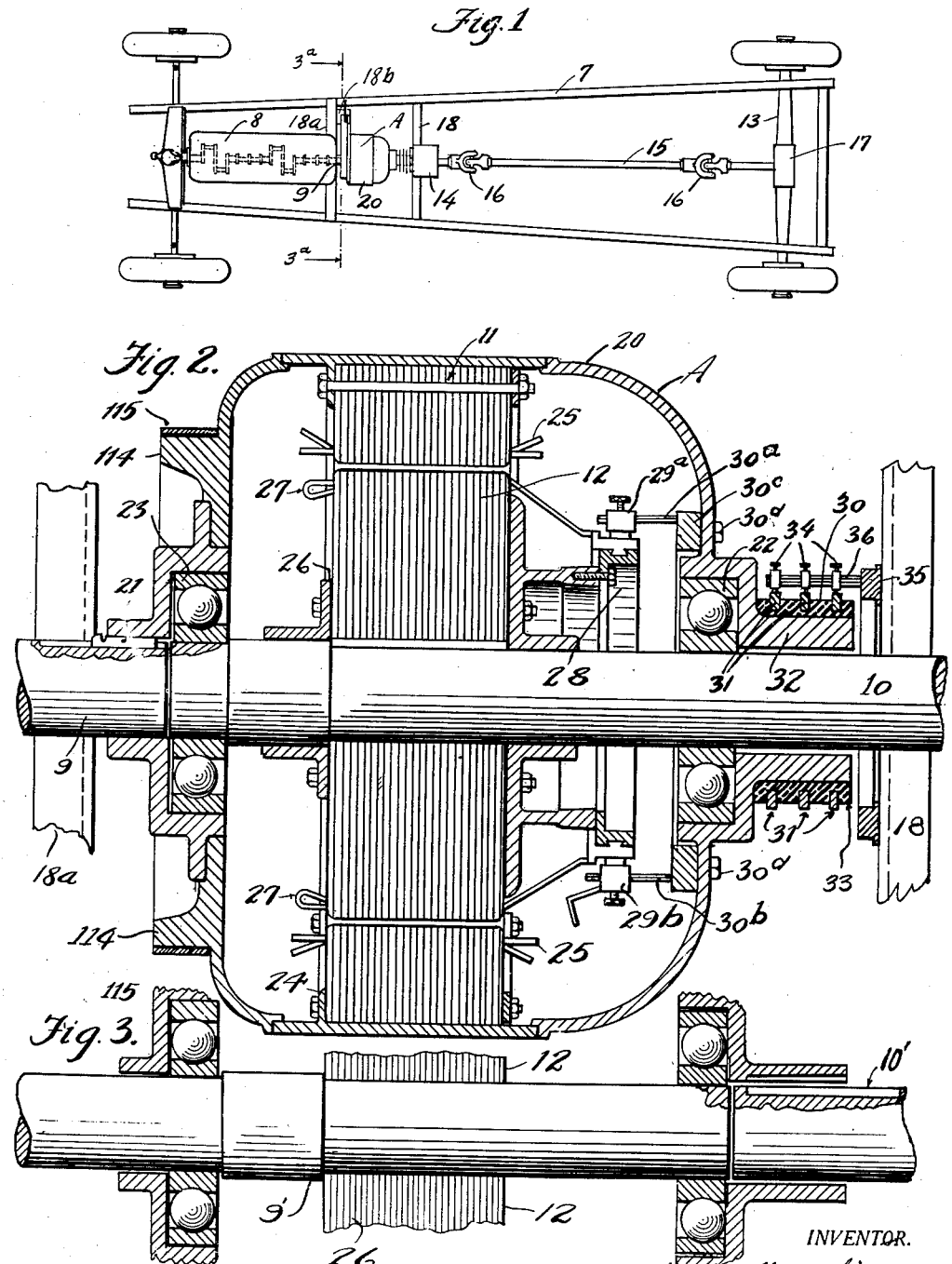

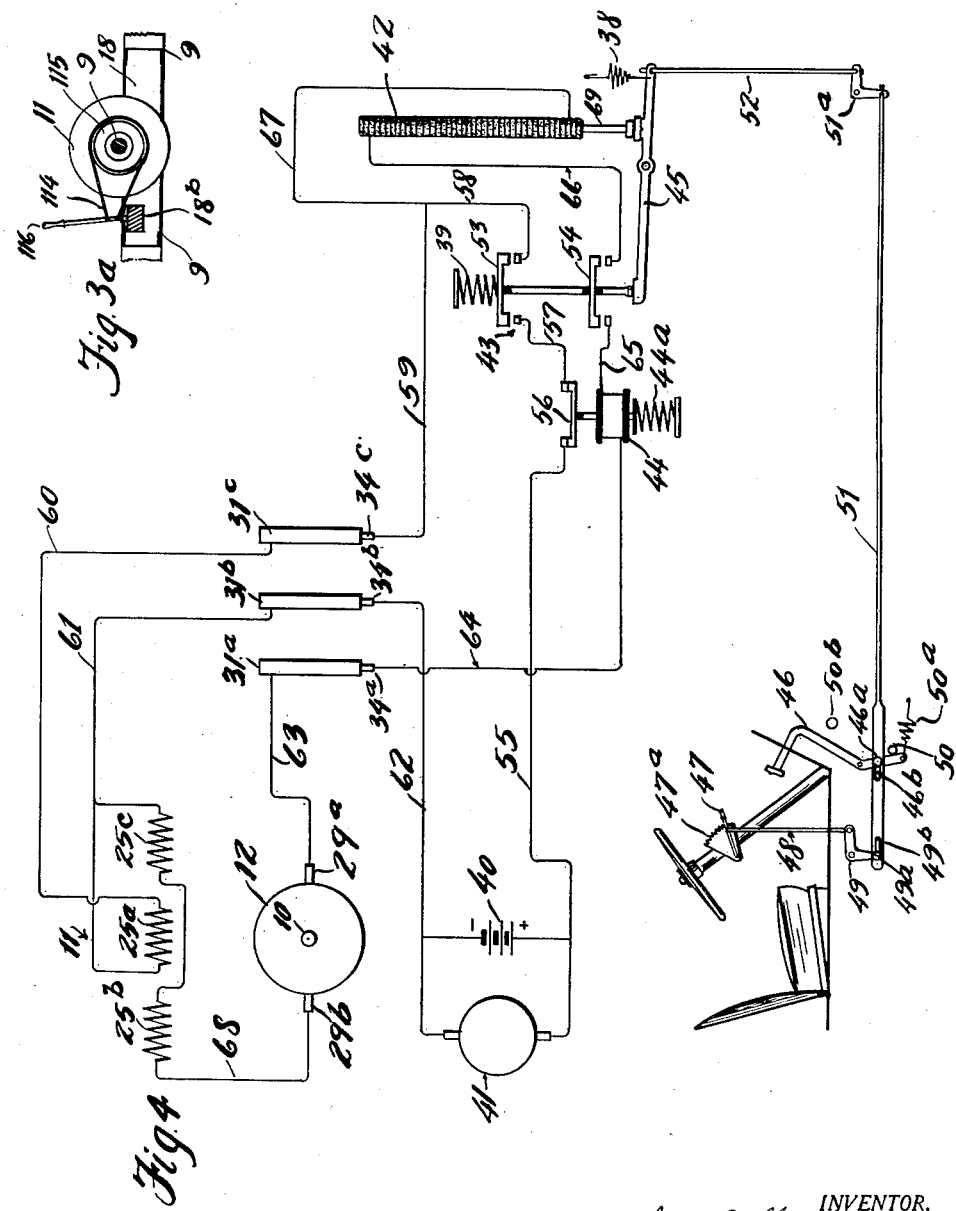

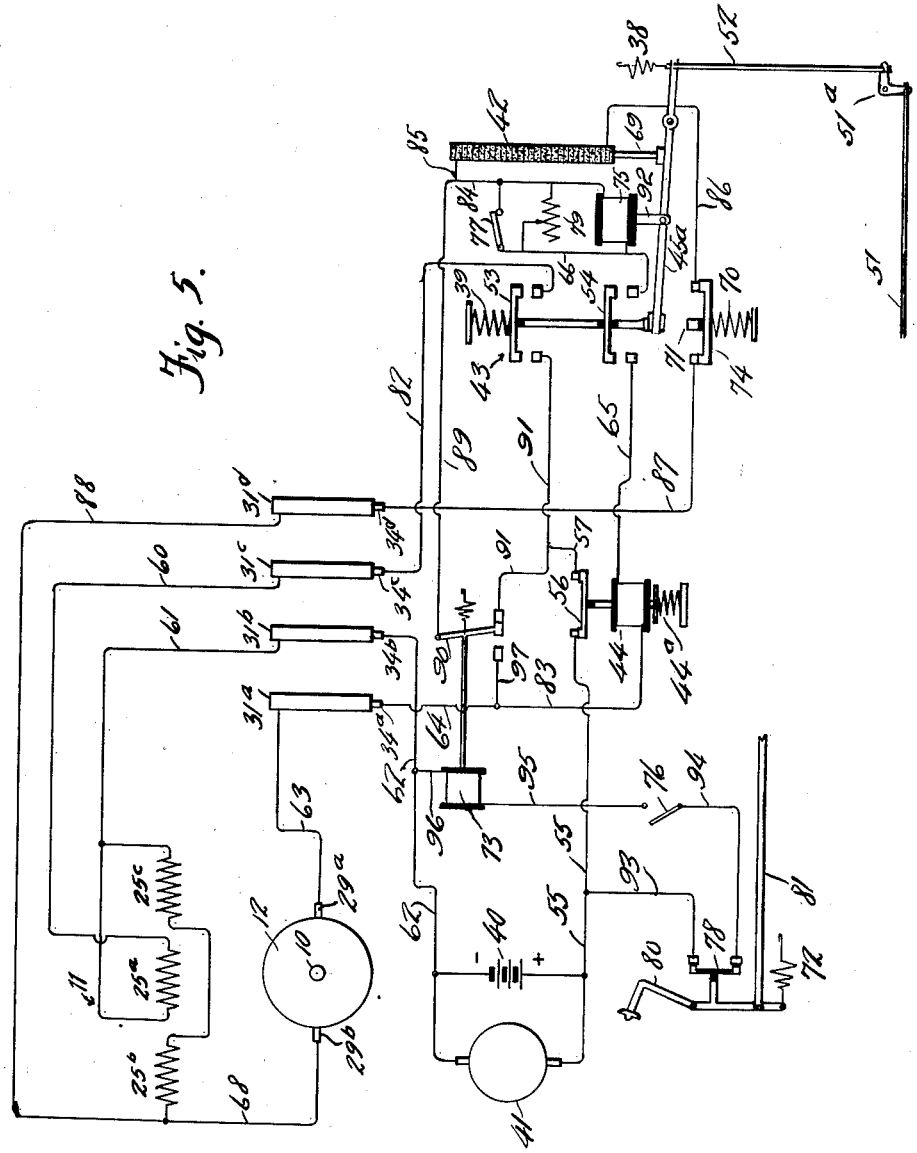

Dec. 11, 1934.　　　I. C. MATTHIESSEN　　　1,983,702
VARIABLE SPEED POWER TRANSMISSION
Filed April 13, 1932　　4 Sheets-Sheet 4

Patented Dec. 11, 1934

1,983,702

UNITED STATES PATENT OFFICE 1,983,702

VARIABLE SPEED POWER TRANSMISSION

Ira C. Matthiessen, Chicago, Ill.

Application April 13, 1932, Serial No. 604,940

28 Claims. (Cl. 172—284)

The present invention relates to variable speed power transmissions for use in various relations but adapted especially for use in motor driven conveyances, such as automobiles, motor boats, locomotives and the like, and has to do more particularly with that type of transmission wherein an electromagnetic clutch in the form of a dynamo electric machine having rotary field and armature elements is used, one element being connected to the prime mover and the other to the rotary member which is normally driven by it.

The principal object of the invention is to provide a transmission of the class mentioned which shall be exceedingly simple and yet possess all the capabilities required by a device of this kind when used in a motor vehicle in all the various conditions of service.

Among the specific objects of the invention, one is to provide for the proper excitation of the field element under all conditions of service. Another is to provide for free wheeling or dynamic braking as desired. Another is to provide for both automatic and operator control of the relative speeds of the two clutch elements in order to give the power and speed required in different conditions of service. This automatic control is also arranged to prevent unreasonable and injurious treatment of the apparatus. Still another object is to make the controls as nearly as possible correspond to the well known controls of vehicles of the kind in question.

Although, as above indicated, the invention is capable of use in various relations, it has been conceived and developed especially with a view to its use in automobiles and consequently it will be described in detail in that connection.

It has been proposed heretofore to use electromagnetic clutches of the dynamo electric machine type, but in such instances the proposed transmissions are relatively heavy and come short of present day requirements in other respects. In carrying out my invention I propose building a lighter transmission than those heretofore proposed and I am enabled to use such a lighter structure because of the high speed engines being used at the present time. I preferably use but one type of field winding and electrically connect coils or turns of the same in such a way as to obtain sufficient excitation from the low voltage sources of electricity now constituting standard equipment. The automatic control which I propose also provides for opening the exciting circuit as soon as it has fully performed its function of excitation. Besides this, the novel field strength control which I employ, automatically maintains that ratio of speed between the rotating elements which suits the amount of power required. The action may be varied through a wide range in accelerating, continuing at uniform speed, free wheeling, retarding and stopping.

These and other objects, features and advantages of my invention will be more fully understood upon reference to the following detailed description taken in connection with the accompanying drawings wherein different embodiments of the invention are illustrated, whereas, for a measure of the scope of the invention, reference should be had to the appended claims.

In said drawings, Fig. 1 is a plan view of a chassis equipped with my improved transmission, the parts being shown more or less conventionally; Fig. 2 is a horizontal longitudinal section through the transmission showing a construction wherein the field element is secured to the prime mover shaft and the armature element is secured to the propeller shaft; Fig. 3 is a similar view illustrating a reversed construction where the armature element is secured to the prime mover shaft and the field element is secured to the propeller shaft; Fig. 3$^a$ is a sectional elevation, taken on a plane indicated by the line 3$^a$—3$^a$ of Fig. 1, showing a brake for use in bringing the field element to a standstill in certain operations of the mechanism; Fig. 4 is a diagram of an electrical system which may be used with the mechanical arrangements of the earlier figures, in which system a variable resistance is arranged for inclusion in series with the armature and field element windings; Fig. 5 is a similar diagram of a second arrangement of circuits which may be used in the same mechanical structure wherein a variable resistance is arranged for inclusion in parallel with the field windings and by varying the resistance the field strength is varied, this system also including additional features, such as (a) the provision of free wheeling or dynamic braking at will, (b) electromagnetic control of the circuits to prevent excessive current flow through the armature circuit, and (c) excitation of the field element at times when the propeller shaft drives the prime mover shaft, as, for example, when going down hill; and Fig. 6 is a similar diagram illustrating circuits capable of the same functions as those of Fig. 5 but in which the excitation of the field element at the time the prime mover is driven by the propeller shaft is accompanied by a reversal of armature connections. Throughout these veiws like characters refer to like parts.

In said drawings, 7 designates the chassis and 8 the internal combustion engine or other prime mover of a motor vehicle provided with a transmission A, acting between the engine shaft 9 and the propeller shaft 10, constructed and arranged in accordance with the present invention. This transmission is in the form of a dynamo electric machine having a rotary field element 11 connected to the crank shaft 9 of the prime mover so as to serve as the fly wheel thereof, and a rotary armature element 12 which is connected to the propeller shaft 10. The propeller shaft, in an automobile installation, will be connected to the driving axles of the rear axle construction 13 through the usual reversing gearing in casing 14, extension shaft 15, universal joints 16 and differential gearing in casing 17. Transverse members 18, 18ª connect opposite frame members of the chassis 7 and serve as supports for the engine, shafting, reversing gearing and other parts. The details of these several parts need not be given as they are well known and in themselves form no part of the present invention.

Instead of the armature element 12 being connected to the propeller shaft 10 and the field element 11 being connected to the prime mover shaft 9, these connections may be reversed, as shown in Fig. 3, where the armature element 12 is connected to the extended prime mover shaft 9' and the field element 11 is connected to the shortened propeller shaft 10'.

The dynamo electric machine serves as an electric clutch between the shafts 9 and 10 in the case of the structure of Fig. 2, and between the shafts 9' and 10' in the case of the structure of Fig. 3. In the former case the prime mover shaft rotates the field structure 11 and in the latter case the same shaft rotates the armature structure 12. In each case the rotating element, thus driven, will under proper conditions apply a torque to the cooperating element secured to the propeller shaft. The driving element will necessarily travel at a greater speed than the element which it drags along. There will be a certain slip between the two elements. This slip may be varied within a wide range by varying the resistances of the dynamo electric circuits. Various arrangements for accomplishing this speed variation may be used.

These structures are merely illustrative of what may be employed. There are obviously many ways of building the dynamo electric machine elements and still accomplish the results desired.

Because of the similarity of operation of the elements when connected as shown in Fig. 2 to their operation when connected as shown in Fig. 3, it will suffice for the purposes of the balance of the description to assume that in all the cases hereinafter considered, except where specifically noted to the contrary, the arrangement of Fig. 2 is employed.

The field structure includes a housing 20 which is connected to the engine shaft 9 by a key 21 or other device. This connection is at one end of the housing. The other end of the housing is mounted to rotate about the shaft 10. A ball bearing 22 provides for the relative movement between these parts and takes up the strain between them as they travel. A similar ball bearing 23 is located at the end of the armature shaft 10 nearest the motor shaft 9. With this construction it is obvious that the field element may be rotated about the axis of the shafts 9 and 10, both when the shaft 10 is quiescent and when it is being rotated.

The interior of the housing 20 is provided with a magnetic core structure 24 which is preferably in the form of slotted magnetic iron laminations extending completely around the interior of the structure and provided with field windings 25 which are passed forward and back through slots in the laminations in a well known manner. The armature element 12 is provided with a similar core 26 of laminations and these laminations are likewise slotted for the reception of the armature windings 27. For the sake of simplicity of illustration only two of the coils 25 and two of the coils 27 are shown in the mechanical views, although obviously these windings will be distributed and connected as is usual in magnetic core structures and windings of the type indicated.

The armature element is also provided with a commutator 28 which travels with the core 26 and has the windings 27 properly connected to its segments as is usual. The commutator 28 has associated with its brushes 29ª, 29ᵇ which are mounted upon suitable brush arms 30ª, 30ᵇ secured to and extending laterally from ring 30ᶜ secured by bolts 30ᵈ to housing 20 of the field element 11. The brushes 29ª, 29ᵇ, two being shown although obviously any other brush arrangement might be employed, are connected to the field windings 25 or to rings 31 mounted upon and insulated from an overhanging sleeve 32 of the field structure 11, according to the particular circuit arrangement employed. These rings are properly separated from the sleeve 32 by insulation 33 and cooperate with the brushes 34 to pass current from the rotary field windings to relatively fixed conductors, mounted upon a fixed portion of the structure, as, for example, on the fixed member 35 which carries the brush arm 36. The member 35 is, in the embodiment shown, connected to and supported by the transverse chassis member 18. From the brushes 34 the electrical connections are extended to different parts of the apparatus employed, the particular connections depending in each case upon the particular circuit used.

Having pointed out suitable mechanical constructions for the elements of the dynamo electric machine which is to serve as the clutch between the driving and driven elements, we may now pass to a consideration of the circuits of an electric system suitable for imposition upon and use with the indicated mechanical structure.

First of all, we may consider the relatively simple series circuit arrangement of Fig. 4. In that circuit the windings of the field element 11 are divided into sections 25ª, 25ᵇ, 25ᶜ, and, as there shown, the armature element 12 upon shaft 10 has the brushes 29ª, 29ᵇ, just as indicated in the mechanical views. In this instance there are three collector rings, just as in the mechanical structure illustrated, and these are, for distinguishing purposes, designated 31ª, 31ᵇ, 31ᶜ, and their associated brushes are similarly designated 34ª, 34ᵇ, 34ᶜ, respectively. Besides these, there is the usual storage battery 40 and associated generator 41. The battery may be that used in starting the car where the installation is one in an automobile. The generator 41 is the usual one employed to charge the battery 40. Besides these, there is a variable resistance 42, an operator's control switch 43, and an electro-magnetic switch 44. The switch 43 is operated by a lever 45 which may be actuated and set through the agency of an operator's hand lever 47 which cooperates with a toothed segment 47$^a$ for this purpose. In other instances the pedal 46 may be used in actuating the lever 45. By reason of the pin and slot connections provided by the pins 46$^a$, 49$^a$ and the corresponding slots 46$^b$, 49$^b$, it is only possible to actuate the lever 45 by the pedal 46 when the setting of the hand lever 47 will permit it. When the latter is in its lowest or "off" position then depressions of the pedal 46 will not move the parts but will be freely movable from its normal engagement with stop 50, against which it is normally held by tension spring 50$^a$, into engagement with stop 50$^b$ which limits its movement in response to the pressure of the operator's foot. Thus, with lever 47 in its lowest position, the full throw of pedal 46 merely reciprocates pin 46$^a$ in its slot 46$^b$ without actuating lever 45 or other connected parts. When the hand lever 47 is in its highest or "fully on" position, then depressions of the pedal 46 will cause full movements of the actuating lever 45 and its connecting parts. When the hand lever 47 is set at intermediate points, then movements of the pedal 46 will cause limited movements of the actuating lever 45. As clearly shown, with the lever 47 in its "off" position, the lever 45 is held in position to maintain its bridging contacts 53, 54 open. As just noted, oscillations of the pedal 46 will not change this circuit condition so long as lever 47 remains in this "off" position.

In the operation of the system of Fig. 4, the engine of the car is started in the usual way and begins to rotate the field element 11 of the dynamo electric machine. With the parts in the "off" position, the position illustrated, there will be no operative pull upon the armature element 12.

The first step after the engine is started is, therefore, to shift the hand lever 47 upward from its "off" position. This movement of the hand lever should be enough at first to close bridging contacts 53, 54. This result is brought about through the shifting of link 48, bell crank lever 49, link 51, bell crank lever 51$^a$, and link 52. Such shifting allows the left hand end of lever 45 to descend sufficiently to close the bridging contacts 53 and 54. This action will be assisted by the springs 38, 39 of the associated mechanism. As clearly shown, spring 38 is a coiled tension spring acting directly upon the main control lever 45, while spring 39 is the return spring of the switch 43. The latter acts in compression between an abutment and the plunger member of the switch, and, through the latter, upon the lever 45. The extent of movement of each of these parts is dependent, as has been said, upon the setting of the hand lever 47, the pins 46$^a$, 49$^a$, acting within the corresponding slots 46$^b$, 49$^b$, to this end. When the lever 47 is in the "off" position, the pin 49$^a$ will engage the left hand end of the slot 49$^b$ and hold the left hand end of the lever 45 in its highest position. At such time pressure on the foot pedal 46 will not shift the lever 45 but will engage stop 50$^b$ before pin 46$^a$ engages the left hand end of slot 46$^b$. However, when the lever 47 is moved out of its "off" position to the extent indicated, pressure upon the pedal 46 will cause pin 46$^a$ to engage the left hand end of slot 46$^b$ and move link 51 and the connected parts far enough to open the contacts 53, 54. Likewise, with other settings of the hand lever 47, it will be possible in like manner to vary the positions of the control lever 45 by actuations of the pedal 46, as before indicated. And, again, if the pedal 46 be not operated, the same shiftings of the lever 45 throughout its entire range of positions may be had by simple up and down movements of the hand lever 47.

Now, since the first upward movement of hand lever 47 is sufficient to close contacts 53, 54, it follows that an energizing circuit for the field winding 25$^a$ will be completed. This circuit may be traced from the positive pole of battery 40 through conductor 55, bridging contact 56, conductor 57, bridging contact 53, conductors 58, 59, brush 34$^c$, ring 31$^c$, conductor 60, winding 25$^a$, conductor 61, ring 31$^b$, brush 34$^b$, and conductor 62, to the negative pole of battery 40. The closing of this circuit will energize the winding 25$^a$ and produce the necessary excitation of the field 11 of the dynamo electric machine.

The closing of bridging contact 54 will also complete an armature circuit which may be traced from the right hand brush 29$^a$ of armature 12 through conductor 63, ring 31$^a$, brush 34$^a$, conductor 64, the winding of switch 44, conductor 65, closed contact 54 of switch 43, conductor 66, resistance 42, conductors 67, 59, brush 34$^c$, ring 31$^c$, conductor 60, windings 25$^a$, 25$^c$, 25$^b$, and conductor 68 to the left hand brush 29$^b$ of the armature. By reason of the closing of the latter circuit at the time the field element 11 is being rotated with its winding 25$^a$ energized, current will be induced in the armature circuit and the current flowing through the three sections of the field windings will continue the proper energization of the field with the result that the rotating field will drag upon the armature and thus rotate it and couple the shafts 9 and 10 and cause the former to drive the latter with a certain amount of slip between the two.

Of course as soon as the current in the armature circuit builds up sufficiently to actuate electromagnetic switch 44, the excitation circuit will be interrupted at bridging contact 56. It will be noted that the contact 56 is normally held in closed position by reason of the pressure of a compression spring 44$^a$ acting between the movable core of the switch and a suitable abutment, provided to take up the reaction of the spring. It will also be noted that the excitation circuit will not be interrupted until proper excitation has occurred. Following the initial energization of the electromagnetic switch 44, the exciting circuit will not be necessary because the necessary energization will be maintained by the current through the armature and field windings in the armature circuit just traced. The winding of electromagnetic switch 44 includes many turns of wire. This is done to make the same sensitive and capable of being held open against the compression of its spring 44$^a$ with a relative small current flowing through the winding.

Now, the movement of the hand lever 47 to the extent stated, which may be called moving it to its "first" position, has not changed the resistance 42. This resistance is of the pile type and according to it the electrical resistance decreases as the elements of the pile are forced together, and increases as they are allowed to separate. The pressure for varying the resistance is obtained through a plunger 69 at one end of the resistance pile. In the case of the circuit arrangement of Fig. 4, the upward movement of the plunger 69 decreases the resistance and the downward movement increases it. As stated, the shifting of the lever 45 far enough to close the two bridging contacts 53, 54 does not vary the resistance 42 which remains at its maximum during the movement of lever 45 through this range. Following this, further downward movement of the left hand end of the lever 45 will raise plunger 69 and thus decrease the resistance.

In this "first" position of hand lever 47, the flow of current through the previously traced circuit through the armature, field and resistance windings in series will be a minimum since the resistance 42 is a maximum. At this time the clutching effect between the two dynamo electric machine elements 11, 12 will be a minimum. That means that at this time there will be the maximum difference between engine speed and propeller shaft speed. Obviously, the degree of slippage between these two elements will depend upon the strength of current flowing through them. In the condition at hand, the relation will be similar to that in the ordinary automobile where the transmission is in low gear.

Under this condition, the exciting field $25^a$ will be energized by current from the battery 40 or generator 41 and the armature conductors will be cutting the field flux so that a voltage will be induced therein. With the field separately excited by a constant current, the flux will be constant and the voltage produced will be directly proportional to the relative speeds of the revolving field and armature. As stated, with the armature at rest, the slippage will be a maximum or 100% for any given engine speed. With the armature circuit closed, the current flowing will be proportional to the resistance in the circuit. Changing the relative speeds or the amount of the resistance or both will change the amount of the current flowing.

If an engine speed of, say, 500 R. P. M. be assumed, then a certain voltage will be induced and a resistance can be chosen that will allow sufficient current to flow to produce a slightly greater torque than that opposing the motion of the car and the car will start to move. If the assumed speed of the engine is not high enough to produce sufficient torque to start the car on a hill or when driving through snow, mud, etc., then the engine speed can be increased and the value of the resistance changed so that the torque produced will be sufficient.

The current required to produce the necessary starting torque may be greater than the rated full-load current, which in turn may be greater than the current required to produce the necessary torque to maintain a moderate driving speed on a level road.

The resistance in the circuit is used to adjust the relative speed of the engine and the car (or the slip between the field and armature) so that the engine will produce the proper torque and will not be overloaded as it would be if the ordinary car were started in high gear. If there were no resistance and the circuit were closed while the engine was running at 500 R. P. M., the car would jerk as it would if the ordinary clutch were let in suddenly with the transmission in high gear.

As the speed of the car increases the relative speed of the engine and car (or slip) decreases thereby decreasing the voltage generated and the current flowing in the circuit and therefore the torque produced. In order to maintain the rate of acceleration of the car, the current must be increased by decreasing the resistance or increasing the speed of the engine or both.

When all the resistance has been cut out, the slip will be just enough to produce the current required to give the torque necessary to maintain the speed of the car. If an incline is reached, then the speed of the car will decrease until the slip has increased to such a point that an increase in the current is produced that will increase the torque to balance the increase in the load. If the same car speed is desired, then the throttle must be opened wider in order to increase the speed of the engine so that the slip, and thereby the torque, will be correspondingly increased.

The maximum torque will be produced when the engine is running with wide open throttle with the car at rest and all the resistance out of the circuit. Such a current flow, however, should not be prolonged as it would speedily injure the mechanism. Keeping in mind the condition of the "first" position of the hand lever 47, we may now resume our specific discussion.

To increase the clutching effect the number of magnetic lines of force which thread through the armature must be increased. This can be done by reducing the resistance 42. Such reduction requires further pressure by plunger 69 on the resistance elements to crowd them together, more or less, as desired. This may be brought about by lowering the left hand end of the lever 45 still further than in the first position.

Let it be assumed then that hand lever 47 is moved upward a little, to a "second" position, then the right hand end of lever 45 raises plunger 69 a little and resistance 42 is decreased somewhat. This reduction in resistance increases the energization of the field and so increases the number of magnetic lines of force being threaded through the armature and hence increases the clutching effect between the driving and driven parts. In this instance, the clutching effect being increased, the slippage between driving and driven parts is decreased. In this position then, the speed of the car is greater. In certain respects this position corresponds to the "intermediate" or "second" position of the ordinary automobile transmission, but, whereas in the latter there are usually only three or four positions, here we may have any number, as we pass from one position to the next by gradual changes in speed ratios. Hence the terms "first", "second", etc., are used more for the sake of making the description clear and to show the relation of the invention to ordinary mechanical transmission practice, than as accurate statements.

But assuming a new or "third" position, then the resistance 42 is cut down still more and the clutching effect is still more increased resulting in less slippage and an increase in the speed of the car.

In like manner we might pass through additional positions as "fourth," "fifth," etc., with the same general action with corresponding increases in clutching effect, corresponding decreases in slippage and corresponding changes in speed ratios of driving and driven parts suited to gradually increasing car speeds. Finally, in the highest position the clutching effect will be the greatest with corresponding results.

Obviously, when it comes to hill climbing or other conditions where gear shifting is desirable, the hand lever 47 may be moved in the reverse direction little by little, or back and forth, as desired, with the corresponding changes in the clutching effects. By accompanying this variation of slippage with engine speed, it is possible to vary the speed and power developed in the propeller shaft 10 throughout all the range required in practice and to do so with great facility.

In this system, the condition of so-called "free wheeling" exists without changing any of the apparatus. And by free wheeling is meant the ability of the engine to drive the propeller shaft whenever the speed of the engine shaft exceeds that of the propeller shaft and on the other hand the freedom of the car to run freely without the engine offering any resistance, whenever the propeller shaft speed exceeds that of the engine shaft.

We have just seen how the engine drives the propeller shaft whenever the engine shaft speed exceeds that of the propeller shaft.

Now, let us consider the case where the reverse condition exists, namely, that where the propeller shaft speed exceeds the engine shaft speed. In this case, as soon as the propeller shaft, in other words, the armature shaft, exceeds the engine shaft in speed, then current will begin to flow through the armature, field and resistance circuit in the opposite direction to that previously traced when the normal speed relation existed. This reversal of current flow will reduce the field magnetism to zero and then, there being no magnetic lines of force for the armature to cut, the current will likewise be zero. This will continue so long as this armature excess speed condition continues. Resulting closures of the excitation circuit will do no good as the current induced thereby will only oppose that of the excitation circuit. But, obviously, as soon as the reverse speed condition takes place, that is to say, the condition wherein the engine speed exceeds the armature speed, then the excitation circuit will start the magnetization of the field and now the current being in the normal direction will build up the magnetism and so the field and armature elements will function as before and the engine shaft will drive the propeller shaft. All this will occur automatically without the operator doing a single thing. But in order to bring about a more gradual acceleration when the magnetism does build up and the engine again begins to drive, it might be well for the operator to restore his lever 47 to the first position and then vary the resistance 42 as may be required. However, the shifting of the lever 47 is merely a matter of judgment depending upon the speed and power conditions and requirements.

Obviously, with this circuit, the stopping of the automobile will be dependent upon the use of brakes. When stopping, the control lever 47 may be moved to "off" position. In such case switch 43 will be opened at contacts 53, 54 and therefore the engine cannot drive the propeller shaft. This position corresponds to that of a disconnected clutch in the ordinary mechanical installation.

When this quiescent condition is reached the automobile may be started, accelerated, retarded and stopped in the same way as just described.

In the diagram of Fig. 5, the field element 11 and the armature element 12 are the same as in the diagram of Fig. 4 but in the diagram of Fig. 5 there is an additional collector ring $31^d$ provided with an associated brush $34^d$. As before, there are the battery 40, generator 41, variable resistance 42, control switch 43, electromagnetic switch 44, pedal 46 and hand lever 47, all as in the prior diagram. There is also a lever $45^a$ which corresponds to lever 45 but has its fulcrum on the right hand side of the plunger 69 instead of on the left hand side, as in Fig. 4. This difference is necessary because in the system of Fig. 4, the resistance is in series with the field windings, whereas in Fig. 5, it is in parallel to them. In the series arrangement a reduction in the resistance increases the current in the field while in the parallel arrangement a reduction in the resistance shunts more current from the field and so cuts down the field current. Hence in Fig. 4, the plunger 69 moves upward to increase the current in the field, and in Fig. 5, it moves downward to produce the same result.

Besides these, there are, in the more extended diagram of Fig. 5, an electromagnetic switch 73, a limit switch 74, and an electromagnetic actuator 75 for actuating the control lever $45^a$, and two manual switches 76 and 77, the former in the circuit of the pedal actuated switch 78 and the latter in parallel to an adjusting resistance 79. The pedal 80 which actuates the switch 78 is provided with a return spring 72. In the ordinary automobile installation, this pedal 80 is connected to one end of the rod 81 which extends to the carburetor of the automobile engine. In short the pedal 80 is what is known as the "accelerator pedal." These various switches and pieces of apparatus are connected in circuits which may now be traced in following out the operation of the system.

In the operation of the system of Fig. 5, the prime mover is started in the usual way and the field element 11 of the dynamo electric machine is rotated. With the parts in the position illustrated, which is the "off" position, there will be no resulting operative pull upon the armature element 12 at this time.

The first step in order to bring the clutch mechanism into operation is, as before, to throw the hand lever 47 into the "first" position while leaving the pedal 46 free. This movement, acting through the links and levers 48, 49, 50, 51, 52 will cause the left hand end of the lever $45^a$ to drop far enough to close the bridging contacts 53, 54 of the switch 43. The closing of the bridging contact 53 will complete the exciting circuit for the field winding $25^a$ which may be traced from the positive pole of the battery 40 through conductor 55, bridging contact 56, conductors 57, 91, bridging contact 53, conductor 82, brush $34^c$, ring $31^c$, conductor 60, winding $25^a$, conductor 61, ring $31^b$, brush $34^b$ and conductor 62 to the negative pole of the battery 40. As the result of the closing of this circuit magnetic lines of force will thread through the windings of the armature element 12.

The threading of such lines of force would have no effect were it not that a circuit through the armature is closed at substantially the same time. The closing of the armature circuit is brought about by the closing of the bridging contact 54. This armature circuit extends from the right hand brush $29^a$ of armature 12 through conductor 63, ring 31ª brush 34ª, conductors 64, 83, the winding of switch 44, conductor 65, bridging contact 54, conductor 66, closed switch 77, and conductor 84, to point 85, at which the current divides, part passing through resistance 42, conductor 86, bridging contact 74, conductor 87, brush 34ᵈ, ring 31ᵈ and conductors 88, 68 to the left hand brush 29ᵇ of the armature element 12, and part through conductor 89, normal switch contact 90, conductor 91, bridging contact 53, conductor 82, brush 34ᶜ, ring 31ᶜ, conductor 60, windings 25ª, 25ᶜ, 25ᵇ and conductor 68 to the left hand brush 29ᵇ. Current passing through these parallel paths divides according to the resistances, part of the current going through the resistance 42 and the other part through the field windings 25ª, 25ᵇ, 25ᶜ.

With the system of Fig. 5, the uppermost position of the left hand end of lever 45ª is one in which the elements of the resistance 42 are most compressed by plunger 69 and consequently one in which the flow of current through the path including resistance 42 is greatest and that through the path including the field windings 25ª, 25ᵇ, 25ᶜ is least. The downward movement of the left hand end of lever 45ª far enough to close contacts 53, 54 will increase the resistance 42 slightly and therefore increase the field magnetism slightly.

This "first" position of the parts produces, therefore, only a slight clutching effect. This means a maximum slippage between the elements 11, 12 and a speed ratio corresponding to a "low" gear in the usual automobile transmission, just as before explained in connection with the system of Fig. 4.

To increase the clutching effect, the parts are moved to, say, a "second" position. There the left hand end of lever 45ª is lower than in the preceding position. This means that resistance 42 is increased and that, in consequence thereof, the current flow through the field windings is increased. This means more magnetic lines of force being cut by the armature and hence more of a drag or clutching action.

To further increase the clutching effect, further movements are made to "third," "fourth" and other succeeding positions until the final position is reached. In all of these the action is the same as before explained in connection with the like steps in the operation of the system of Fig. 4.

This slippage between the clutch elements may be varied with the speed of the prime mover to provide for all the conditions met with in driving an automobile.

In the system under consideration, the resistance 42 is varied in the manner heretofore described through the actuation of the plunger 69 under the direct control of the lever 45ª. It therefore follows that where the switch 77 is closed, the device 75 is not in service. In such case the resistance would be varied through actuations in the manner heretofore described.

It may be desirable, however, to make use of the device 75. When this is done the switch 77 is opened. Then the current passing through the device 75 will depend upon the amount of the variable resistance 79 which is included in parallel with the energizing winding of the device 75. By accurately setting the resistance 79, it is possible to get a very accurate adjustment of the force applied to the lever 45ª by the device 75. The latter device is preferably a solenoid, which, when energized, draws upward on its core 92, to pull upward on the left hand end of the lever 45ª. Such upward pull on the lever 45ª compresses the elements of the pile type resistance 42 and decreases the resistance. An opposite movement of the lever increases the resistance 42.

In this connection it may be recalled that the resistance 42, which is varied in this way by actuations of the lever 45ª, is in parallel with the field windings 25ª, 25ᵇ, 25ᶜ. As a result, decreasing the resistance 42 decreases the flow of current through the field windings and consequently cuts down the magnetic field. On the other hand, increasing the resistance 42 increases the flow of current through the field windings and increases the magnetic field. This parallel arrangement of Fig. 5 is in contrast to the series arrangement of Fig. 4.

It will be noted that the control device 75 is in the series portion of the armature circuit and will be operated in accordance with the current flowing through that portion of the circuit. Ordinarily the resistance 79 will be set so that the device 75 will operate to cut down the magnetism only when the current through the armature circuit becomes excessive. In other words, the device 75 will act as protective device to prevent overloading the armature circuit and causing injury to the apparatus.

In this diagram I have also shown a limit switch 74 which bridges its contacts but may be moved to open position by the lowering of the left hand end of the actuating lever 45. Normally a compression spring 70 acting against an abutment presses the contact 74 into closed position and yieldingly holds it there. When free, the pull of the spring 38 upon the distant end of the lever or the application of force from the control lever 47 through the interconnecting links and levers must be such as to cause the left hand end of the lever 45ª to engage the stem 71 and force the contact 74 open against the action of its spring 70. When contact 74 is open then the parallel branch through the resistance 42 is open; this means that at this time all the armature current is flowing through the field windings for at that time both are in series. The series circuit thus produced may be traced from the right hand armature brush 29ª through conductor 63, ring 31ª, brush 34ª, conductors 64, 83, winding of electromagnetic switch 44, conductor 65, bridging contact 54, conductor 66, closed switch 77, conductors 84, 89, normal contact 90, conductor 91, bridging contact 53, conductor 82, brush 34ᶜ, ring 31ᶜ, conductor 60, windings 25ª, 25ᶜ, 25ᵇ and conductor 68 to the left hand armature brush 29ᵇ. This field energizing circuit may be used at times to advantage in the control of the driving of the vehicle.

Obviously, when it comes to retarding or accelerating the automobile or otherwise regulating its speed and power, the hand lever 47 may be moved back and forth, as desired, and corresponding changes in clutching effects produced, just as heretofore described in connection with the operation of the system of Fig. 4. By varying the engine speed and the degree of clutching all the conditions of service may be readily taken care of.

When it comes to stopping the automobile in which the system of Fig. 5 is installed, if the switch 43 be opened, then we have the condition which corresponds to disconnecting the clutch in the usual mechanical automobile installation. The excitation and armature circuits are then opened and consequently no clutching effect is obtainable between the driving and driven parts. Under such conditions the car may be stopped by a simple application of the brakes.

If the switch 43 be left with its contacts 53, 54 closed, then it is possible with hand switch 76 open, to obtain free wheeling. In such case, whenever the armature speed exceeds that of the engine, the current through the armature and the connected field windings 25ª, 25ᵇ, 25ᶜ and resistance 42 is reversed relative to its direction of flow when the engine speed exceeds that of the armature. Hence, as before explained, the magnetism of the field is reduced to zero and current through the armature ceases. This is not built up again so long as the armature speed exceeds that of the field and engine. But, as before, as soon as the armature speed falls below that of the field and engine, then the exciting circuit is closed and current begins to flow as normally, through the armature and field windings and resistance. As soon as this occurs the engine begins to drive the propeller shaft and the car. This is the usual free wheeling operation.

With the circuit of Fig. 5 it is possible to obtain dynamic braking by simply closing switch 76. When this is done, the control circuit of electromagnetic switch 73 may be controlled by switch 78 under the control of the accelerator pedal 80. By using the accelerator pedal to open and close switch 78 it is obvious that if at any time in the operation of the vehicle it be necessary to accelerate the speed of the engine and the pedal 80 be depressed for this purpose, as it of course would be, then the circuit connections through electromagnetic 73 will be opened so that it will not be possible to have the parts improperly connected for forward driving.

Now, it will be noted that when the switches 76 and 78 are closed, then conductor 93 on the one hand and conductors 94, 95, 96, on the other, connect the winding of the electromagnetic switch 73 directly across the terminals of the battery 40. Assuming then that switch 76 is in closed position, then, whenever switch 78 is closed, a circuit is provided which may be traced from the positive pole of battery 40 through conductors 55, 93, bridging contact 78, conductor 94, closed switch 76, conductor 95, the winding of electromagnetic switch 73 and conductors 96, 62 to the negative pole of the battery.

By the closing of this circuit, electromagnetic switch 73 is thrown to its alternate position. At that time, with this particular circuit, current is supplied from battery 40 for the purpose of energizing one of the field windings of the field element 11. This is necessary in order to maintain magnetic lines of force which will resist rotation of the armature element 12. As soon as contact 90 of switch 73 is moved to its alternate position, the armature circuit path is changed and the electromagnetic switch 44 and the control device 75 are shunted by a path which leads from conductor 64 through conductor 97, alternate contact 90 and conductor 89 to point 85. The establishment of this shunt causes electromagnetic switch 44 to become deenergized and thereby allow the closing of its bridging contact 56 by reason of the action of spring 44ª upon its plunger.

As soon as this shunt is closed, and so long as switch 43 remains closed, a circuit exists which may be traced from the positive pole of battery 40 through the conductor 55, bridging contact 56, conductors 57, 91, bridging contact 53, conductor 82, brush 34ᶜ, ring 31ᶜ, conductor 60, winding 25ª, conductor 61, ring 31ᵇ, brush 34ᵇ, and conductor 62 to the negative pole of the battery. The circuit just traced is the excitation circuit for the field windings which exists for the purpose of dynamic braking. At this time the armature circuit will extend from the right hand brush 29ª through conductor 63, ring 31ª, brush 34ª, conductors 64, 97, alternate contact 90, conductor 89, resistance 42, conductor 86, bridging contact 74, conductor 87, brush 34ᵈ, ring 31ᵈ, and conductors 88, 68 to the left hand brush 29ᵇ of the armature.

Now, if we consider the case of dynamic braking, then whenever the armature speed exceeds that of the engine, there would be the breaking down of the magnetism and the reduction of the current as before explained, and this would continue were the switch 73 not brought into play. But where it is brought into play, as we have just seen, current from the battery 40 provides the necessary excitation so that the armature element, when rotating in the field, will encounter opposition. Obviously the degree of opposition may be varied by varying the resistance 42 in the armature circuit just traced. In this way it is possible to retard and otherwise control the automobile whenever the momentum of the car causes the armature to rotate faster than the field. Positively driving the prime mover by the propeller shaft in this way brings the advantage of applying the mechanical resistance of the prime mover to the retarding or stopping of the car. Thus the compression serves as a braking force.

In the diagram of Fig. 6 we have circuits and apparatus which are the same as those of the diagram of Fig. 5 with a few exceptions. These exceptions are provided for the purpose of reversing the connections to the armature to suit the condition which exists when the armature element 12 rotates faster than the field element 11. The modified and additional elements include an additional ring 31ᵉ on the armature shaft associated with an additional brush 34ᵉ. The electromagnetic switch 73 of the earlier diagram gives place to a reversing switch 73ª which has two movable contacts 100, 101, normally held in the position illustrated by a retractile spring 102. Although not shown in this diagram, the same hand levers and pedals for controlling the actuation of the bar 45ª are employed, as in the circuit of Fig. 5.

In the operation of the system of Fig. 6, the initial energizing circuit is closed as before by the bridging contact 53 of the control switch 43. This circuit may be traced from the positive pole of battery 40 through conductor 55, bridging contact 56, conductor 57, bridging contact 53, conductors 103, 104, 105, brush 34ᶜ, ring 31ᶜ, conductor 60, winding 25ª, conductor 61, ring 31ᵇ, brush 34ᵇ, and conductor 62 to the negative side of the battery. The circuit for the armature element is similar to the circuit of Fig. 5 and like it includes the resistance 42 and field windings in parallel paths. This circuit may be traced from the right hand brush 29ª of the armature through conductor 63, ring 31ª, brush 34ª, conductor 64, the winding of electromagnetic switch 44, conductor 65, bridging contact 54, conductor 66, closed switch 77, conductors 84, 106, normal switch contact 101, and conductor 107 to point 108 where the current divides, part going through conductor 105, brush 34ᶜ, ring 31ᶜ, conductor 60, field windings 25ᵃ, 25ᶜ, 25ᵇ, conductor 88, ring 31ᵈ, brush 34ᵈ and conductor 109 to point 110, the other part going from point 108 through conductor 104, resistance 42, conductor 86, bridging contact 74 and conductor 87 to point 110, and from point 110, where the current parts unite, through conductor 111, normal contact 100, conductor 112, brush 34ᵉ, ring 31ᵉ, and conductor 113 to the left hand brush 29ᵇ of the armature. Just as before, as soon as the armature circuit has been closed, the exciting circuit is interrupted at contact 56 of switch 44.

The relative speeds of the rotating elements 11 and 12 will be varied, as before explained, by varying the resistance 42. The relation of the windings and resistance are in this case the same as in the case of the diagram of Fig. 5, that is to say, they are in parallel to each other.

In the case of the diagram of Fig. 6, there is no need of operating the reversing switch 73ᵃ except when it is desired to use dynamic braking. For free wheeling the hand switch 76 is left open and the operations are the same as before described. But with the switch 76 closed, then whenever the armature speed exceeds that of the driving engine or, what is the same thing, the field element, there is a change in armature connections in order to provide proper field magnetization.

From our previous considerations we have seen that when the speed of rotation of the field element 11 exceeds that of the armature element 12 then the current flow through the armature and field windings may be considered as passing at any instant from the right hand brush 29ᵃ of the armature 12 through the circuit paths previously traced back to the left hand brush 29ᵇ of the armature. Now if the condition be one wherein the armature speed of rotation exceeds that of the field, then obviously the current flow will be in the opposite direction, that is to say, from the left hand brush 29ᵇ through the circuit and back to the right hand brush 29ᵃ. This, as is obvious, would oppose the residual magnetism in the field and cause the latter to be reduced to zero and current through the armature circuit to cease. This is not built up again so long as the armature speed exceeds that of the field. But, as before, as soon as the armature speed falls below that of the field, then the exciting circuit is closed and current begins to flow as normally. As soon as this occurs the engine begins to drive the propeller shaft and the car. This, as before noted, is the free wheeling operation.

With the circuit of Fig. 6, it is possible to obtain dynamic braking by simply closing switch 76. With this switch closed, the circuit of electromagnetic switch 73ᵃ may be readily controlled at switch 78 by the pedal 80, just as in the case of the circuits of Fig. 5. The closing of the circuit through the winding of electromagnetic switch 73ᵃ causes the latter to throw its reversing contacts to their alternate or reversing position. This switch circuit is the same as that through the winding of electromagnetic switch 73 of Fig. 5 and need not be again traced. With the reversing switch contacts 100, 101 in their alternate position and with the armature speed exceeding that of the field, it follows that there is an excitation circuit closed to again build up the magnetism of the field. This excitation circuit extends from the positive pole of the battery 40 through conductor 55, bridging contact 56, conductor 57, bridging contact 53, conductors 103, 104, 105, brush 34ᶜ, ring 31ᶜ, conductor 60, winding 25ᵃ, conductor 61, ring 31ᵇ, brush 34ᵇ, and conductor 62 to the negative pole of the same battery. The field being excited, current will begin to flow through the armature circuit but because its speed exceeds that of the field it will be from armature brush 29ᵇ, through the reversing switch contacts 100, 101 to the brush 29ᵃ. This means that the current flowing through the armature will pass through the field windings 25ᵃ, 25ᵇ, 25ᶜ in the same direction as the excitation circuit. The result will be the continued proper energization of the field and the opening of the excitation circuit at contact 56, as will be obvious from what has been previously explained.

During the usual condition, namely, that wherein the field rotation exceeds that of the armature, the current flow from the right hand armature brush 29ᵃ through the resistance 42 and field windings 25ᵃ, 25ᶜ, 25ᵇ will be from right to left as will be apparent from a consideration of the circuit previously traced with the switch 73ᵃ in its normal position. When the other condition exists, namely, that wherein the field rotation is less than that of the armature, then the current flow from the left hand brush 29ᵇ this time, not the right as formerly, will be in the same direction through the field windings 25ᵃ, 25ᶜ, 25ᵇ, namely from left to right, provided the switch 73ᵃ is in reversed or alternate position.

The latter circuit, with the switch 73ᵃ reversed and the armature speed of rotation exceeding that of the field, may be traced from the left hand brush 29ᵇ through conductor 113, ring 31ᵉ, brush 34ᵉ, conductor 112, alternate contact 100, conductor 107 to point 108, there dividing one part passing through conductor 104, resistance 42, conductor 86, bridging contact 74, and conductor 87 to point 110, the other part extending from point 108 through conductor 105, brush 34ᶜ, ring 31ᶜ, conductor 60, windings 25ᵃ, 25ᶜ, 25ᵇ (from right to left), conductor 88, ring 31ᵈ, brush 34ᵈ, and conductor 109 to point 110, the current from both branches uniting at point 110 and flowing therefrom over a common circuit through conductor 111, alternate contact 101, conductor 106, switch 77, conductor 66, bridging contact 54, conductor 65, winding of electromagnetic switch 44, conductor 64, brush 34ᵃ, ring 31ᵃ, and conductor 63 to the right hand brush 29ᵃ of armature 12. Thus it will be seen that with the armature speed exceeding that of the field and with the reversing switch 73ᵃ in reversed position, the current flow at any assumed instant will be from right to left in the field windings 25ᶜ, 25ᵇ, 25ᵃ, which is the proper direction to maintain proper magnetization of the field core.

Since the variable resistance 42 is in parallel circuit with the field windings no matter how the rotary speeds of the field and armature may be related, it follows that the current in the field may be varied to increase or decrease the field magnetism as desired both for accelerating and retarding, all in the manner heretofore pointed out. If at any time it is desired to cut out the forces which resist the travel of the armature in this way, it is only necessary for the operator to open the switch 76 whereupon a free wheeling condition will result and there will be no further retarding effect upon the speeding armature. Obviously, this retardation may be utilized at any time when it is desired to stop the automobile or to regulate its travel when going down an inclined portion of the road.

From the preceding description, it will be seen that I have produced systems and apparatus which have the advantage that a low voltage battery, such as the usual 6 volt battery now commonly used on automobiles, may be used without necessitating a designing of the field and armature on a 6 volt basis. The design for these elements of the dynamo electric machine may be based upon the use of 220 volts, 550 volts or even higher voltages. By so doing the current required to deliver a given amount of power will be proportionately reduced, thereby greatly reducing the copper losses which are proportional to the square of the current, and consequently considerably increasing the efficiency of the mechanism. Put somewhat more briefly, I employ a low voltage to assist the residual magnetism of the field poles when starting, so that the magnetic field will be built up more rapidly. The low voltage is obtained from the battery and the subsequent higher voltage from the running machine. Because of this, the windings of the apparatus need be only large enough to take care of a smaller current. This reduces the amount of copper necessary and thus keeps down the size of the machine. In this way a more efficient design is produced which is well suited to modern conditions and practices of the automotive art.

Furthermore I make use of an exciting winding which forms part of the main field. Consequently it is used efficiently. There is no extra weight from a winding which is used only part of the time. The separate source of excitation is also of value. It is always present to build up a sufficient magnetic field whenever needed. In the case of the armature revolving faster than the field, the voltage generated in the armature by the residual magnetism, will tend to build up a field in opposition and ultimately neutralize the original field. By having a separate exciting source available, it is always possible to provide the requisite field and voltage.

Again, when going down a long hill, the improved mechanism and system which I have devised can be put in reverse by use of the usual reversing gearing contained in casing 14. In that case the armature would then revolve in the same relative direction as it would when the engine was pulling the car. Then, by varying the amount of slip, the power of the engine could be used directly to control the speed of the car. By speeding up the engine or reducing the slip (increasing the clutching effect), the force tending to retard the automobile could be increased. Of course, if the slip were increased too much or the engine unduly speeded up with a good clutching effect in service, then the car would stop or go up the hill backward, or in some cases the engine might be stalled.

By using the controlling resistance in parallel with, or shunted across, the field windings, as in Figs. 5 and 6, instead of in series with the armature and field, only part of the current will pass through the resistance, thereby reducing the losses in the resistance which are equal to the current squared times the resistance. When so used, the carrying capacity of the resistance need not be large. This lower capacity enables a saving to be made in the cost of the resistance.

When going down a hill, the engine can, if desired, be shut off and the field element 11 locked or otherwise held from rotating. The armature connections may then be reversed by throwing switch 73$^a$ of Fig. 6 in case that circuit is used, or the reversing gears in casing 14 might be used to reverse the direction of rotation. Then the clutch would become a dynamic brake and by varying the resistance 42 the degree of braking could be controlled. A suitably operated hand brake 114 acting on brake drum 115 forming part of the casing 20 might be used to brake and hold the field structure 11 against rotation for the purpose mentioned. As shown, a suitable hand lever 116 within easy reach of the operator may be moved laterally to tighten or loosen the band 114 on the drum 115. The same may be held in gripping position by hand as shown, or otherwise as desired. It is mounted upon a projection 18$^b$ of the frame member 18$^a$.

Although only one set of windings 25$^a$, 25$^b$, 25$^c$ is shown yet it is obvious that two or more such sets might be used. The dynamo electric circuits shown are typical rather than completely illustrative.

It will be apparent that in carrying out my invention other arrangements may be used than those herein disclosed. I therefore aim to cover by the terms of the appended claims all those alterations and modifications which rightly come within the scope and purview of my invention.

What I claim as new and desire to secure by Letters Patent of the United States is:

1. In combination with a prime mover; a driven part; variable speed power transmitting means between the prime mover and driven part, comprising an electric clutch in the form of a dynamo electric machine having rotary field and armature elements, one element being connected to the prime mover and the other element to the driven part, said field including an exciting winding to provide initial excitation and other windings to cooperate with said exciting winding to provide subsequent excitation; a source of electricity; means for supplying current from said source to said exciting winding; a resistance; means for extending a circuit from said armature element to two junction points, two parallel branch paths joining said junction points, the windings of said field element being in one of said branch paths and said resistance being in the other of said branch paths; means responsive to current in said divided armature circuit to cut off the supply of current to said exciting winding; means for varying said resistance to vary the slip between said field and armature elements when in operation, means for subsequently modifying the armature circuit to place the closing of the exciting circuit beyond the control of current in the armature circuit.

2. In combination with a prime mover; a rotary member; variable speed power transmitting means operative between the prime mover and rotary member, comprising an electric clutch in the form of a dynamo electric machine having rotary field and armature elements, one connected to the prime mover and the other to the rotary member, said field element including an exciting winding; a source of electricity; means for closing a circuit through said source and exciting winding and thereupon completing the circuit of the armature element; means responsive to current in the armature circuit to open said exciting circuit; and means for subsequently modifying the armature circuit to place the closing of the exciting circuit beyond the control of current in the armature circuit.

3. In combination with a prime mover; a rotary member; variable speed power transmitting means operative between the prime mover and rotary member, comprising an electric clutch in the form of a dynamo electric machine having rotary field and armature elements, one connected to the prime mover and the other to the rotary member, said field element including an exciting winding; a source of electricity; means for closing a circuit through said source and exciting winding and thereupon completing the circuit of the armature element; means responsive to current in the armature circuit to open said exciting circuit; and means for providing an alternate circuit for the armature element in shunt to said opening means.

4. In combination with a prime mover; a rotary member; variable speed power transmitting means operative between the prime mover and rotary member, comprising an electric clutch in the form of a dynamo electric machine having rotary field and armature elements, one connected to the prime mover and the other to the rotary member, said field element including an exciting winding; a source of electricity; means for closing a circuit through said source and exciting winding and thereupon completing the circuit of the armature element; means responsive to current in the armature circuit to open said exciting circuit; and means for providing an alternate circuit for the armature element in shunt both to said closing means and to said opening means.

5. In combination with a prime mover; a rotary member; variable speed power transmitting means operative between the prime mover and rotary member, comprising an electric clutch in the form of a dynamo electric machine having rotary field and armature elements, one connected to the prime mover and the other to the rotary member, said field element including an exciting winding to provide initial excitation and other windings to cooperate with said exciting winding to provide subsequent excitation; a source of electricity; variable resistance means including a control switch for closing two current paths, one from said source through said exciting winding and the other through said armature element and said initial exciting and other field windings and said resistance, said field windings and resistance being in parallel branches and said branches being in series with the armature element; an electromagnetic switch having its windings included in said armature path and its contacts in said exciting winding path; and an operator controlled element for initially actuating said control switch and subsequently thereto actuating said variable resistance to vary the clutching action of said clutch elements.

6. In combination with a prime mover; a rotary member; variable speed power transmitting means operative between the prime mover and rotary member, comprising an electric clutch in the form of a dynamo electric machine having rotary field and armature elements, one connected to the prime mover and the other to the rotary member, said field element including an exciting winding; a source of electricity; an operator controlled member; a variable resistance actuated by said member; an electric switch actuated by said member; an electromagnetic switch; and conductors providing current paths, one including said source of electricity, said exciting winding and contacts of both of said switches, and the other including the armature element, energizing windings of the electromagnetic switch, contacts of said electric switch and said variable resistance.

7. In combination with a prime mover; a rotary member; variable speed power transmitting means operative between the prime mover and rotary member, comprising an electric clutch in the form of a dynamo electric machine having rotary field and armature elements, one connected to the prime mover and the other to the rotary member, said field element including an exciting winding; a source of electricity; an operator controlled member; a variable resistance actuated by said member; an electric switch actuated by said member; an electromagnetic switch; an electromagnetic device for actuating said member in addition to the operator control of the same; and conductors providing current paths, one including said source of electricity, said exciting winding and contacts of both of said switches, and the other including the armature element, contacts of said electric switch, said variable resistance and energizing windings of said electromagnetic switch and said electromagnetic device.

8. In combination with a prime mover; a rotary member; variable speed power transmitting means operative between the prime mover and rotary member comprising an electric clutch in the form of a dynamo electric machine having rotary field and armature elements, one connected to the prime mover and the other to the rotary member; a variable resistance; means for including said resistance and windings of said field element in circuit with said armature element, said resistance and windings being in parallel relation to each other; and electromagnetic means for automatically actuating said resistance to cut down the current flow in said field element windings whenever the current through the armature element exceeds a definite value.

9. In combination with a prime mover; a rotary member; variable speed power transmitting means operative between the prime mover and rotary member comprising an electric clutch in the form of a dynamo electric machine having rotary field and armature elements, one connected to the prime mover and the other to the rotary member; a variable resistance; means for including said resistance and windings of said field element in circuit with said armature element, said resistance and windings being in parallel relation to each other; an operator controlled member for varying said resistance; and electromagnetic means for automatically actuating said resistance to cut down the current flow in said field element windings whenever the current through the armature element exceeds a definite value.

10. In combination with a prime mover; a rotary member; variable speed power transmitting means operative between the prime mover and rotary member, comprising an electric clutch in the form of a dynamo electric machine having rotary field and armature elements, one connected to the prime mover and the other to the rotary member, said field element including an exciting winding; a source of electricity; a variable resistance; means for including said resistance in circuit with said armature element; operator controlled means for closing a circuit through said source and exciting winding; operator controlled means for varying said resistance to vary the slip between said field and armature elements; automatic means responsive to current in said armature circuit to open said exciting circuit; and operator controlled means for shifting the armature and exciting winding connections to provide field excitation throughout a prolonged period of rotation of said field element at a speed in excess of that of the armature element.

11. In combiantion with a prime mover; a rotary member; variable speed power transmitting means operative between the prime mover and rotary member, comprising an electric clutch in the form of a dynamo electric machine having rotary field and armature elements, one connected to the prime mover and the other to the rotary member, said field element including an exciting winding; a source of electricity; a variable resistance; means for including said resistance in circuit with said armature element; operator controlled means for closing a circuit through said source and exciting winding; operator controlled means for varying said resistance to vary the slip between said field and armature elements; automatic means responsive to current in said armature circuit to open said exciting circuit; and means for shifting the armature and exciting winding connections to provide field excitation throughout a prolonged period of rotation of said field element at a speed in excess of that of the armature element.

12. In combination with a prime mover; a driven part; variable speed power transmitting means between the prime mover and driven part, comprising an electric clutch in the form of a dynamo electric machine having rotary field and armature elements, one element being connected to the prime mover and the other element to the driven part, said field including an exciting winding; a source of electricity; means for supplying current from said source to said exciting winding; a resistance; means for extending the armature circuit through said resistance and windings of said field element; means for cutting off the current supply from said source to said exciting winding in response to the said extension of said armature circuit; means for varying said resistance to vary the slip between said field and armature elements as the same are used in transmitting power; and means for retarding the rotation of that one of said dynamo electric machine elements which is connected to the prime mover.

13. In combination with a prime mover; a driven part; variable speed power transmitting means between the prime mover and driven part, comprising an electric clutch in the form of a dynamo electric machine having rotary field and armature elements, one element being connected to the prime mover and the other element to the driven part, said field including an exciting winding; a source of electricity; means for supplying current from said source to said exciting winding; a resistance; means for extending the armature circuit through said resistance and windings of field element, said armature and field windings being in parallel; means responsive to current in the latter circuit to cut off the supply of current to said exciting winding; means for varying said resistances to vary the slip between said field and armature elements when in operation; and means for retarding the rotation of that one of said dynamo electric machine elements which is connected to the prime mover.

14. In combination with a prime mover; a rotary member; variable speed, power transmitting means operative between the prime mover and rotary member, comprising an electric clutch in the form of a dynamo electric machine having rotary field and armature elements, one connected to the prime mover and the other to the rotary member, said field element including an exciting winding to provide initial excitation and other windings to cooperate with said exciting winding to provide subsequent excitation; a source of electricity; a variable resistance; means including a control switch for closing two current paths, one from said source through said exciting winding and the other through said armature element and said exciting and other windings and said resistance, said field windings and resistance being in parallel branches and said branches being in series with the armature element; an electromagnetic switch having its windings included in said armature path and its contacts in said exciting winding path; an operator controlled element for actuating said control switch and said variable resistance in sequence, the variations of said resistance varying the clutching action of said clutch elements; and a reversing switch for reversing the normal connections of said armature to said exciting and other field windings.

15. In combination with a prime mover; a driven part; variable speed power transmitting means between the prime mover and driven part, comprising an electric clutch in the form of a dynamo electric machine having rotary field and armature elements, one element being connected to the prime mover and the other element to the driven part, said field including an exciting winding to provide initial excitation and other windings to cooperate with said exciting winding to provide subsequent excitation; a source of electricity; a control switch; means including contacts of said control switch for supplying current from said source to said exciting winding; a variable resistance; means for extending a circuit from said armature element to two junction points, two parallel branch paths joining said junction points, the windings of said field element and other contacts of said control switch being in one of said branch paths and said variable resistance being in the other of said branch paths; means responsive to current in said divided armature circuit to cut off the supply of current to said exciting winding; means for varying said resistance to vary the slip between said field and armature elements when in operation; an operator controlled element for actuating said control switch and said resistance varying means in sequence; and means for reversing said armature circuit to provide suitable braking action when the speed of the rotary member exceeds that of the field element.

16. In combination with a prime mover; a rotary member; variable speed power transmitting means operative between the prime mover and rotary member, comprising an electric clutch in the form of a dynamo electric machine having rotary field and armature elements, one connected to the prime mover and the other to the rotary member, said field element including an exciting winding; a source of electricity; means for closing a circuit through said source and exciting winding and thereupon completing the circuit of the armature element; means responsive to current in the armature circuit to open said exciting circuit; means for providing an alternate circuit for the armature element in shunt to said opening means; and means for reversing said armature circuit to provide suitable braking action when the speed of the rotary member exceeds that of the field member.

17. In combination with a prime mover; a rotary member; variable speed power transmitting means operative between the prime mover and rotary member, comprising an electric clutch in the form of a dynamo electric machine having rotary field and armature elements, one connected to the prime mover and the other to the rotary member, said field element including an exciting winding; a source of electricity; an operator controlled member; a variable resistance actuated by said member; an electric switch actuated by said member; an electromagnetic switch; conductors providing current paths, one including said source of electricity, said exciting winding and contacts of both of said switches, the other including the armature element, energizing windings of the electromagnetic switch, contacts of said electric switch and said variable resistance, and means for reversing said latter path through the armature element to provide suitable braking action when the speed of the rotary element exceeds that of the field element.

18. In combination with a prime mover; a rotary member; variable speed power transmitting means operative between the prime mover and rotary member, comprising an electric clutch in the form of a dynamo electric machine having rotary field and armature elements, one connected to the prime mover and the other to the rotary member, said field element including an exciting winding to provide initial excitation and other windings to cooperate with said exciting winding to provide subsequent excitation; a source of electricity; variable resistance means including a control switch for closing two current paths, one from said source through said exciting winding and the other through said armature element and said initial exciting and other field windings and said resistance, said field windings and resistance being in parallel branches and said branches being in series with the armature element; an electromagnetic switch having its windings included in said armature path and its contacts in said exciting winding path; an operator controlled element for initially actuating said control switch and subsequently thereto actuating said variable resistance to vary the clutching action of said clutch elements; an electromagnetic device having its windings included in said armature path; and mechanical connections between said device and said control switch and variable resistance to operate the same in response to current variations in said armature path.

19. In combination with a prime mover; a rotary member; variable speed power transmitting means operative between the prime mover and rotary member, comprising an electric clutch in the form of a dynamo electric machine having rotary field and armature elements, one connected to the prime mover and the other to the rotary member, said field element including an exciting winding to provide initial excitation and other windings to cooperate with said exciting winding to provide subsequent excitation; a source of electricity; variable resistance means including a control switch for closing two current paths, one from said source through said exciting winding and the other through said armature element and said initial exciting and other field windings and said resistance, said field windings and resistance being in parallel branches and said branches being in series with the armature element; an electromagnetic switch having its windings included in said armature path and its contacts in said exciting winding path; an operator controlled element for initially actuating said control switch and subsequently thereto actuating said variable resistance to vary the clutching action of said clutch elements, and means for short circuiting the windings of said electromagnetic switch to place the operation of the same beyond the control of current in said armature path.

20. In combination with a prime mover; a rotary member; variable speed power transmitting means operative between the prime mover and rotary member, comprising an electric clutch in the form of a dynamo electric machine having rotary field and armature elements, one connected to the prime mover and the other to the rotary member, said field element including an exciting winding; a source of electricity; an operator controlled member; a variable resistance actuated by said member; an electric switch actuated by said member; an electromagnetic switch; conductors providing current paths, one including said source of electricity, said exciting winding and contacts of both of said switches, and the other including the armature element, energizing windings of the electromagnetic switch, contacts of said electric switch and said variable resistance; an electromagnetic device having its windings included in said armature path; and mechanical connections between said device and said control switch and variable resistance to operate the same in response to current variations in said armature path.

21. In combination with a prime mover; a rotary member; variable speed power transmitting means operative between the prime mover and rotary member, comprising an electric clutch in the form of a dynamo electric machine having rotary field and armature elements, one connected to the prime mover and the other to the rotary member, said field element including an exciting winding; a source of electricity; an operator controlled member; a variable resistance actuated by said member; an electric switch actuated by said member; an electromagnetic switch; conductors providing current paths, one including said source of electricity, said exciting winding and contacts of both of said switches, and the other including the armature element, energizing windings of the electromagnetic switch, contacts of said electric switch and said variable resistance; and means for short circuiting the windings of said electromagnetic switch to place the operation of the same beyond the control of current in said armature path.

22. In combination with a prime mover; a rotary member; variable speed power transmitting means operative between the prime mover and rotary member, comprising an electric clutch in the form of a dynamo electric machine having rotary field and armature elements, one connected to the prime mover and the other to the rotary member, said field element including an exciting winding; a source of electricity; an operator controlled member; a variable resistance actuated by said member; an electric switch actuated by said member; an electromagnetic switch; an electromagnetic device for actuating said member; conductors providing current paths, one including said source of electricity, said exciting winding and contacts of both of said switches, and the other including the armature element, contacts of said electric switch, said variable resistance and energizing windings of said electromagnetic switch and said electromagnetic device; and mechanical connections between said electromagnetic device and said control switch and variable resistance to operate the same in response to current variations in said armature path.

23. In combination with a prime mover; a rotary member; variable speed power transmitting means operative between the prime mover and rotary member, comprising an electric clutch in the form of a dynamo electric machine having rotary field and armature elements, one connected to the prime mover and the other to the rotary member, said field element including an exciting winding; a source of electricity; an operator controlled member; a variable resistance actuated by said member; an electric switch actuated by said member; an electromagnetic switch; an electromagnetic device for actuating said member in addition to the operator control of the same; conductors providing current paths, one including said source of electricity, said exciting winding and contacts of both of said switches, and the other including the armature element, contacts of said electric switch, said variable resistance and energizing windings of said electromagnetic switch and said electromagnetic device; and means for short circuiting the windings of said electromagnetic switch to place the operation of the same beyond the control of current in said armature path.

24. In combination with a prime mover; a rotary member; variable speed power transmitting means operative between the prime mover and rotary member comprising an electric clutch in the form of a dynamo electric machine having rotary field and armature elements, one connected to the prime mover and the other to the rotary member; a variable resistance an actuating member for varying said resistance; electromagnetic means to automatically move said actuating member to vary said resistance; means for including said resistance and windings of said field element in circuit with said armature element, said resistance and windings being in parallel relation to each other, whereby varying said resistance varies in turn the current flow in the windings of the field element in accordance with curent variations in the armature element; operator controlled means to move said actuating member independently of said electromagnetic means to vary said resistance; and means responsive to the movement of said operator controlled means to include said resistance and energizing windings of said electromagnetic means in the armature circuit.

25. In combination with a prime mover; a rotary member; variable speed power transmitting means operative between the prime mover and rotary member comprising an electric clutch in the form of a dynamo electric machine having rotary field and armature elements, one connected to the prime mover and the other to the rotary member; a variable resistance; an actuating member for varying said resistance; electromagnetic means to automatically move said actuating member to vary said resistance; operator controlled means to move said actuating member independently of said electromagnetic means to vary said resistance; means responsive to the movement of said operator controlled means to include said resistance and energizing windings of said electromagnetic means in the armature circuit; and means for reversing the circuit through said armature to provide suitable braking action when the speed of the rotary member exceeds that of the field element.

26. In combination with a prime mover; a rotary member; variable speed power transmitting means operative between the prime mover and rotary member comprising an electric clutch in the form of a dynamo electric machine having rotary field and armature elements, one connected to the prime mover and the other to the rotary member, said field element including energizing windings; a variable resistance; a switch and electrical connections for including said energizing windings and said resistance in circuit with said armature element; and electromagnetic means for automatically actuating said switch and resistance in sequence, the switch to control said armature circuit and the resistance to vary the current flow in the windings of said field element in accordance with current variations in said armature circuit.

27. In combination with a prime mover; a rotary member; variable speed power transmitting means operative between the prime mover and rotary member comprising an electric clutch in the form of a dynamo electric machine having rotary field and armature elements, one connected to the prime mover and the other to the rotary member, said field element including energizing windings; a variable resistance; a switch and electrical connections for including said energizing windings and said resistance in circuit with said armature element; a movable member to operate said switch and to vary said resistance; operator controlled means for shifting said member to close said switch and change said resistance; and electromagnetic means for shifting said member in accordance with current variations in said armature circuit, said switch operations being in sequence with the operation of said variable resistance.

28. In combination with a prime mover; a rotary member; variable speed power transmitting means operative between the prime mover and rotary member, comprising an electric clutch in the form of a dynamo electric machine having rotary field and armature elements, one connected to the prime mover and the other to the rotary member, said field element including an exciting winding to provide initial excitation and other windings to cooperate with said exciting winding to provide subsequent excitation; a source of electricity; an operator controlled member; a variable resistance actuated by said member; an electric switch actuated by said member; an electromagnetic switch; and conductors providing current paths, one including said source of electricity, said exciting winding and contacts of both of said switches, and the other including the armature element, said initial exciting and other energizing field windings, energizing windings of said electromagnetic switch, contacts of said electric switch and said variable resistance.

IRA C. MATTHIESSEN.